United States Patent
Dybdal et al.

(10) Patent No.: US 11,349,581 B1
(45) Date of Patent: May 31, 2022

(54) INTERFERENCE MONITORING IN RADIO COMMUNICATION SYSTEMS

(71) Applicant: The Aerospace Corporation, El Segundo, CA (US)

(72) Inventors: Robert B. Dybdal, Palos Verdes Estates, CA (US); Catherine A. Allen, Los Angeles, CA (US); Lamont Cooper, Jr., Fullerton, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 353 days.

(21) Appl. No.: 16/736,099

(22) Filed: Jan. 7, 2020

(51) Int. Cl.
*H01Q 21/06* (2006.01)
*H01Q 21/24* (2006.01)
*H04B 1/10* (2006.01)
*H04B 7/10* (2017.01)
*H04B 17/345* (2015.01)

(52) U.S. Cl.
CPC .............. *H04B 17/345* (2015.01); *H04B 7/10* (2013.01)

(58) Field of Classification Search
CPC ............ H01Q 1/12; H01Q 3/00; H01Q 21/06; H01Q 21/24; H01Q 25/00; H01Q 25/001; H04B 7/10; H04B 17/34; H04B 17/345; H04B 1/10; H04B 1/1036
See application file for complete search history.

(56) References Cited

U.S. PATENT DOCUMENTS

| | | | | |
|---|---|---|---|---|
| 4,283,795 A | * | 8/1981 | Steinberger | H04B 7/002 342/361 |
| 5,023,620 A | * | 6/1991 | Matsuura | H04B 7/002 342/362 |
| 5,068,667 A | * | 11/1991 | Mizoguchi | H04B 7/002 342/362 |
| 5,298,908 A | * | 3/1994 | Piele | H04B 7/10 342/363 |
| 5,440,308 A | | 8/1995 | Dybdal et al. | |
| 5,592,177 A | * | 1/1997 | Barrett | H01Q 21/245 342/361 |
| 5,739,788 A | | 4/1998 | Dybdal et al. | |

(Continued)

OTHER PUBLICATIONS

Dybdal et al., "A Low Cost High Power Microwave Receiver," IEEE Trans Instrumentation and Measurement IM-41, pp. 349-352, Jun. 1992, in 4 pages.

*Primary Examiner* — Tho G Phan
(74) *Attorney, Agent, or Firm* — Knobbe Martens Olson & Bear

(57) ABSTRACT

Apparatus and methods for monitoring interference in radio communication systems are provided. In certain embodiments, an interference monitor system for a ground terminal detects for interference based on a sum of the power levels of orthogonal polarizations of detected interference, thereby allowing the total and average peak interference power levels to be obtained independent of interference polarization. Further, the interference can be divided into frequency bins over the received signal bandwidth(s), thereby facilitating measurement of interference spectral characteristics. Multiple interference monitors can be included to detect interference over the full angular range over which potential interference has access as well as to determine an angular direction of the interference.

22 Claims, 10 Drawing Sheets

(56) References Cited

U.S. PATENT DOCUMENTS

| | | | |
|---|---|---|---|
| 5,781,845 A | 7/1998 | Dybdal et al. | |
| 5,872,540 A * | 2/1999 | Casabona | H01Q 3/2611 |
| | | | 342/362 |
| 5,952,962 A | 9/1999 | Dybdal | |
| 6,055,431 A | 4/2000 | Dybdal | |
| 6,421,008 B1 | 7/2002 | Dybdal et al. | |
| 6,731,240 B2 | 5/2004 | Dybdal et al. | |
| 6,816,026 B2 | 11/2004 | Dybdal | |
| 6,937,186 B1 | 8/2005 | Dybdal et al. | |
| 6,965,343 B1 | 11/2005 | Dybdal et al. | |
| 7,239,275 B2 | 7/2007 | Dybdal et al. | |
| 7,373,105 B2 | 5/2008 | Dybdal et al. | |
| 7,463,191 B2 | 12/2008 | Dybdal et al. | |
| 7,518,551 B2 | 4/2009 | Dybdal et al. | |
| 7,551,134 B2 | 6/2009 | Dybdal et al. | |
| 7,602,336 B2 | 10/2009 | Dybdal et al. | |
| 7,800,537 B2 | 9/2010 | Dybdal et al. | |
| 7,965,228 B2 | 6/2011 | Dybdal et al. | |
| 8,199,851 B1 | 6/2012 | Dybdal et al. | |
| 8,259,857 B2 | 9/2012 | Dybdal et al. | |
| 8,462,879 B2 | 6/2013 | Dybdal et al. | |
| 8,614,644 B2 | 12/2013 | Dybdal et al. | |
| 8,614,940 B1 | 12/2013 | Dybdal et al. | |
| 8,711,675 B1 | 4/2014 | Dybdal et al. | |
| 8,804,808 B1 | 8/2014 | Dybdal et al. | |
| 9,065,521 B1 | 6/2015 | Dybdal et al. | |
| 9,628,122 B1 | 4/2017 | Dybdal et al. | |
| 9,806,747 B1 | 10/2017 | Dybdal et al. | |
| 10,056,675 B1 | 8/2018 | Dybdal | |
| 11,025,311 B1 * | 6/2021 | Rios | H04B 7/0617 |
| 2009/0033575 A1 | 2/2009 | Dybdal et al. | |

* cited by examiner

INTERFERENCE MONITORING IN RADIO COMMUNICATION SYSTEMS

STATEMENT OF GOVERNMENT INTEREST

This invention was made with government support under Contract No. FA8802-19-C-0001, awarded by the Department of the Air Force. The government has certain rights in this invention.

FIELD OF THE DISCLOSURE

Embodiments of the invention relate to electronic systems, and more particularly, to interference monitoring in radio communication systems.

BACKGROUND

Radio communications rely on transmission of radio frequency (RF) signals from a transmitting antenna of an RF transmitter to a receiving antenna of an RF receiver. When an RF receiver utilizes a narrow beamwidth antenna for signal reception, it is desirable for the receiving antenna to be accurately pointed at the signal source to receive maximum signal power. High gain antennas having a narrow beamwidth are commonly used in conjunction with closed loop monopulse tracking systems that can dynamically align the position of the receiving antenna to receive the maximum available signal power. A deviation between ideal antenna pointing and actual antenna pointing is referred to as pointing loss.

Closed loop monopulse tracking systems operate by processing two types of antenna patterns. The first antenna pattern is a sum pattern used for data reception and having its maximum gain when aligned with the signal. The second antenna pattern is a difference pattern where a pattern null exists on the axis of the sum beam. The ratio of the difference and sum beams has a linear variation for deviations from the antenna axis, and this linear deviation is used by the control system to automatically maintain antenna alignment with the signal as the relative positions of the antenna and signal direction vary.

In some scenarios, a ground-based radio communication system having a high gain and narrow beamwidth antenna receives intentional or unintentional interference that can result in system outages or degraded operation of the system. Because potential interference sources and directional attributes of potential interference signals can vary over time, monitoring for interference on a continuous basis is beneficial.

Some approaches to interference monitoring include the use of site surveying systems with expensive spectrum analyzers that sample signals over broad, multi-Gigahertz bandwidths and that conduct detailed frequency and time domain analysis of potential interfering signals. Such approaches consume significant computing resources and increase the cost of implementation of the ground-based radio communication system. Additionally, approaches focused primarily on scanning broad bandwidths are not well-suited for determining directional attributes of potential sources of interference, and do not measure interference incident on individual ground terminal antennas.

SUMMARY

Embodiments of the present inventions described herein are directed to systems and methods of monitoring and optionally addressing interference within the signal bandwidth of RF signals incident on an antenna, including but not limited to narrow beamwidth antennas. Various embodiments of interference monitors and methods discussed herein can identify interference signals incident at an antenna, such as antennas used at a ground terminal, although the interference monitors described herein can be applied to other types of systems.

In some embodiments, interference monitors are used to determine levels of an interference signal and directional characteristics of the interference signal relative to the receiving antenna of a ground terminal. For example, multiple interference monitors can be arranged around a ground terminal to provide angular detection coverage unobscured by the ground terminal antenna structure. Various embodiments of the interference monitors and methods discussed herein can be configured to further analyze the interference within a signal bandwidth of an associated ground terminal to determine the spectral and temporal characteristics of the interference.

In some embodiments, the power levels of orthogonal polarizations of detected interference can be summed, thereby allowing the total and average peak interference power levels to be obtained independent of interference polarization. Further, the interference can be divided into frequency bins over the received signal bandwidth(s), thereby facilitating measurement of interference spectral characteristics. As such, an interference monitoring system can measure peak and average power levels as well as spectral characteristics.

In some embodiments, upon detection of interference, commands can be sent to a tracking control system of the ground terminal to freeze closed loop tracking commands and transition to open loop tracking so as to prevent interference-caused, beam pointing errors. The embodiments of the interference monitoring systems and methods disclosed herein can include recording characteristics of the interference upon detection.

An aspect of the disclosure includes the realization that large-bandwidth frequency spectrum analyzers that sample signals over broad bandwidths and conduct detailed frequency and time domain analysis of potential interfering signals can be unnecessarily complex and expensive with regard to some known environments of use. Thus, an interference monitoring system that monitors interference over specific frequency bandwidths can result in a less expensive, less complex system that can provide sufficient interference detection functionality for purposes of real-time detection of, and optionally, control system compensation for incident interference. Such specific frequency bandwidths can be selected and/or tuned to correspond to one or more frequency bandwidths used by specific ground terminals of a ground station. In some embodiments, interference monitoring systems can facilitate the continuous operation of interference monitoring at specific frequency bandwidths without large-bandwidth frequency spectrum analyzers, thereby resulting in a less expensive and complex system, yet enable beneficial interference monitoring and compensation.

A further aspect of the disclosure is the ability to process interference received by multiple interference monitors to determine a directional attribute of the interference in addition to recording spectral and temporal characteristics of the interference. The direction of the interference relative to the ground terminal together with the spectral and temporal interference characteristics provides system operators with additional information useful in determining the location of interference source(s).

The systems, methods and devices of this disclosure each have several innovative aspects, no single one of which is solely responsible for the desirable attributes disclosed herein.

DETAILED DESCRIPTION

Figure 1:
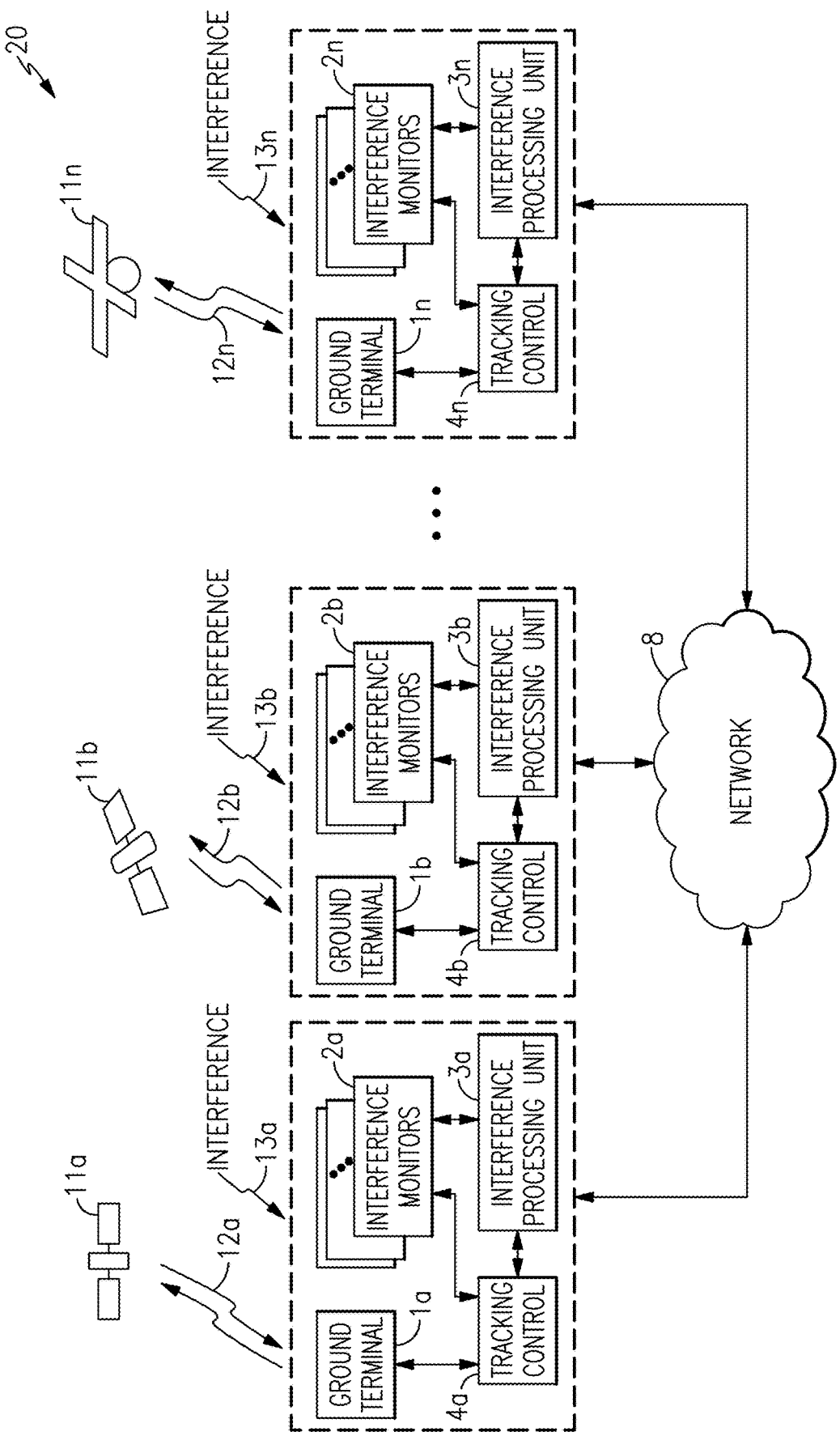
FIG. 1 is a schematic diagram of a ground station according to one embodiment.

FIG. 1 is a schematic diagram of a ground station 20 according to one embodiment. The ground station 20 includes ground terminals 1a, 1b, . . . 1n, groups of interference monitors 2a, 2b, . . . 2n, interference processing units 3a, 3b, . . . 3n, tracking control systems 4a, 4b, . . . 4n, and a network 8. As shown in FIG. 1A, the ground terminals 1a, 1b, . . . 1n are in communication with satellites 11a, 11b, . . . 11n over wireless communication links 12a, 12b, . . . 12n, respectively. As indicated by the ellipses, the ground station 20 can include any number of ground terminals and associated components and systems.

A ground station, such as the ground station 20 of FIG. 1, typically includes one or more ground terminals each one of which communicates with a different satellite and includes power systems, facility buildings, interfaces with terrestrial communications, and/or other features. One skilled in the art will appreciate that the ground station 20 can include additional components including without limitation, processing units, output components (e.g., displays), input components, and/or various physical components (e.g., protective coverings, mounting fixtures, etc.). The ground station 20 can further be integrated with facilities having separate functionality configured to provide power, communication network connectivity, and the like.

To effectively communicate with a satellite, a ground terminal's antenna can be pointed toward a satellite under control of an auto-tracking system. For example, in the illustrated embodiment, the direction that antennas of ground terminals 1a, 1b, . . . 1n are pointed are controlled by tracking control systems 4a, 4b, . . . 4n, respectively.

In some scenarios, the ground station 20 may receive intentional or unintentional interference that can result in system outages or degraded operation. Such interference can be present at any of the ground terminals 1a, 1b, . . . 1n, and can originate from the same or different interference source(s).

In the illustrated embodiment, the ground terminals 1a, 1b, . . . 1n receive electromagnetic interference 13a, 13b, . . . 13n, respectively. Electromagnetic interference is also referred to herein as an interference signal or interference. Such interference can serve as a blocker or jammer signal preventing reception of a desired RF signal from a satellite. For example, interference signals 13a, 13b, . . . 13n can disrupt received signals over communication links 12a, 12b, . . . 12n, respectively, thereby resulting in communication outages.

To detect and mitigate interference, there is a need for a monitoring capability of a ground station to identify and respond to the presence of external interference. Although FIG. 1 illustrates an application of interference monitors in a ground station, the teachings herein are also applicable to other types of radio communication systems.

Certain ground stations include a central site survey system for surveying interference. However, a central site survey system does not measure interference incident on a specific ground terminal and in some cases, the interference is blocked by site features and does not affect a given ground terminal's operation.

In contrast, the ground station 20 of FIG. 1 includes groups of interference monitors associated with each ground terminal. For example, the group of interference monitors 2a is associated with the ground terminal 1a. Likewise, the group of interference monitors 2b is associated with the ground terminal 1b, while the group of interference monitors 2n is associated with the ground terminal 1n.

Thus, the interference monitors herein can be used to measure interference incident on a given ground terminal of a ground station. As indicated by the ellipses, any desired number of interference monitors can be included for each ground terminal, such as one interference monitor, two interference monitors, three interference monitors, or four or more interference monitors. In certain implementations, a number of interference monitors included per ground terminal can vary from one ground terminal to another.

Illustratively, the antenna pattern of a ground terminal has a main lobe (also referred to as main beam) that is aligned with the direction of the satellite with which the ground terminal communicates. Since the signal power received by an antenna is directly proportional to the antenna's gain level in the signal's direction, the antenna of the ground terminal is configured to provide a sufficiently high peak gain of its main lobe to receive an adequate signal-to-noise ratio (SNR) for reliable communications with a distant satellite. For example, in various implementations, the main lobe of the antenna of a ground terminal can have a peak gain level in a range of about 40 dBi and 60 dBi. Such peak antenna gain levels also have narrow antenna beamwidth corresponding to an angular extent of the main antenna lobe having gain levels within 3 dB of the peak value. For instance, example values of beamwidth for 40 dBi and 60 dBi antennas are about 1.5° and 0.15°, respectively. The illustrated tracking control systems 4a, 4b, . . . 4n provide dynamic alignment of the main antenna lobe of a corresponding ground terminal with respect to a satellite that the ground terminal is in communication with.

Away from the main lobe, the ground terminal's antenna has a plurality of sidelobes with lower gain levels. Interfering signals (for instance, sent either intentionally or unintentionally from RF terrestrial transmitters) are received by lower gain antenna sidelobes of the ground terminal. Because terrestrial interference is much closer to the ground terminal than the distant satellite, interfering signals received by the lower gain sidelobes can have enough received power to reduce the signal quality of a desired satellite signal received through the main lobe of the ground terminal's antenna.

As shown in FIG. 1, interference processing units 3a, 3b, . . . 3n are included for processing and responding to interference detection signals provided by the groups of interference monitors 2a, 2b, . . . 2n, respectively.

In certain implementations, each of the interference processing units 3a, 3b, . . . 3n includes or is connected to recording circuitry for storing digital data representing received interference, and a storing function of the recording circuitry is activated in response to the associated interference monitors detecting interference. For example, the recording circuitry can be commanded to record when interference is detected and to not record when interference is not detected. Accordingly, interference is efficiently recorded and memory storage is conserved. In contrast, ground stations that continuously record time periods without interference waste memory storage.

Additionally or alternatively, interference monitoring is used to control positioning of the ground terminal's receiving antenna. For example, when interference is detected, the corresponding ground terminal's tracking control system can be commanded to maintain the known antenna positioning so interference does not produce beam pointing errors. Thus, auto-tracking can be disabled in response to detecting interference.

Most ground terminals have historical records or logs of past pointing angle variations versus time as well as knowledge of the satellite ephemeris, time of day, and terminal location that allows determination of the antenna's azimuth and elevation time variations. This data provides an open loop pointing mode referred to as program track. In certain applications, program track data is used for nominal antenna pointing to initially acquire the satellite signal and is generally sufficiently accurate to be within the acquisition range of closed loop monopulse tracking. After acquisition, the system transitions to closed loop monopulse tracking to dynamically maintain a minimal antenna tracking loss. When interference is present, a command is issued to cease closed loop tracking and to switch to program tracking so that interference cannot interfere with the closed loop tracking operation.

The interference monitors associated with a particular ground terminal operate independently from the ground terminal since its purpose is to detect the presence of interference rather than the desired signal transmitted by a satellite. In operation, if the desired signal quality received by a particular ground terminal is degraded, three possible causes exist. Malfunction of the ground terminal receiver can be determined by the ground terminal's built in test equipment (BITE) that evaluates the ground terminal's electronics. Antenna pointing errors that reduce the received signal power can be determined by comparing the angle encoder outputs of the ground terminal's antenna with the azimuth and elevation values obtained from program track data for the time of reduced signal quality occurrence. The outputs of a group of interference monitors associated with a particular ground terminal are examined to determine if interference is degrading the desired signal reception. Thus, interference monitors further extend the capability to determine potential causes of reduced signal quality in a timely fashion.

In the illustrated embodiment, the network 8 is used to interconnect the interference processing units 3a, 3b, . . . 3n, thereby helping to share information pertaining to interference across ground terminals. By networking multiple interference processing units, data pertaining to interference can be shared across ground terminals to enhance estimation of the nature of and/or location of interference source(s).

Figure 2A:
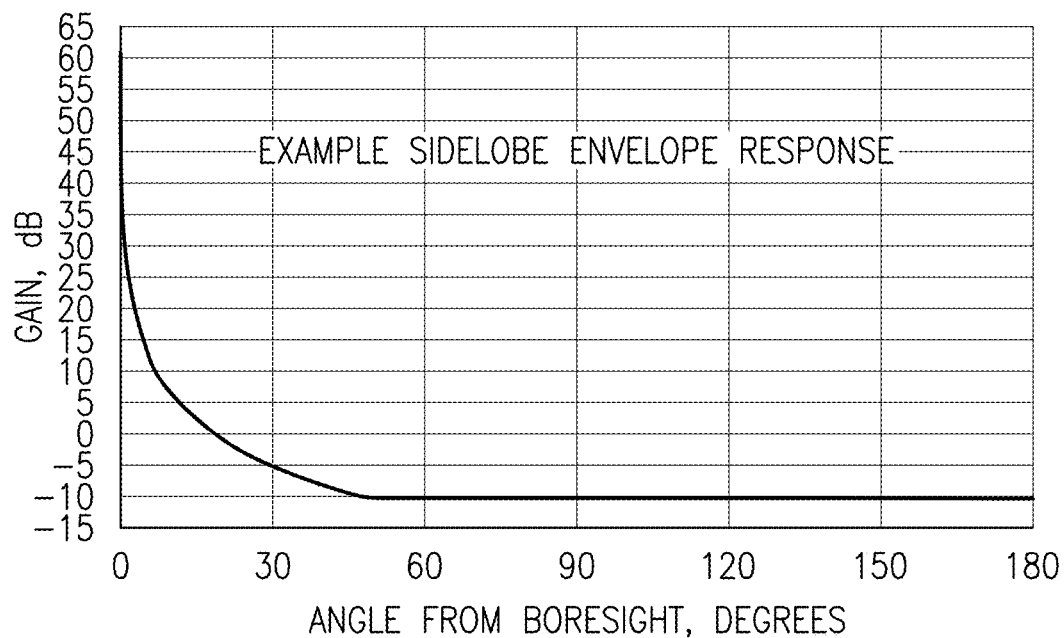
FIG. 2A is a plot of one example of sidelobe envelope response for a receiving antenna of a ground terminal.

FIG. 2A is a plot of one example of sidelobe envelope response for a receiving antenna of a ground terminal. The plot depicts receiving antenna gain in decibels versus angle from the receiving antenna's boresight in degrees. As shown in FIG. 2A, the receiving antenna's peak gain level is about 60 dBi.

Desired signals received along the axis of maximum gain for the directional antenna, generally referred to as the antenna's boresight, are received with sufficiently high power levels to achieve reliable communications. However, the sidelobe gain substantially decreases away from the boresight axis. The sidelobe envelope provides a bound on the peak sidelobe antenna gain values. In practice, the sidelobes have a lobe structure and the minimum gain of the lobe structure is lower than the envelope values.

The antenna gain levels of the antennas of the interference monitors exceed the levels of the wide angle sidelobes of the ground terminal's receiving antenna to thereby achieve satisfactory interference detection performance. The plot of FIG. 2A illustrates maximum levels and it should be recognized that the lobe structure of the sidelobes is not given by the example envelope.

Figure 2B:
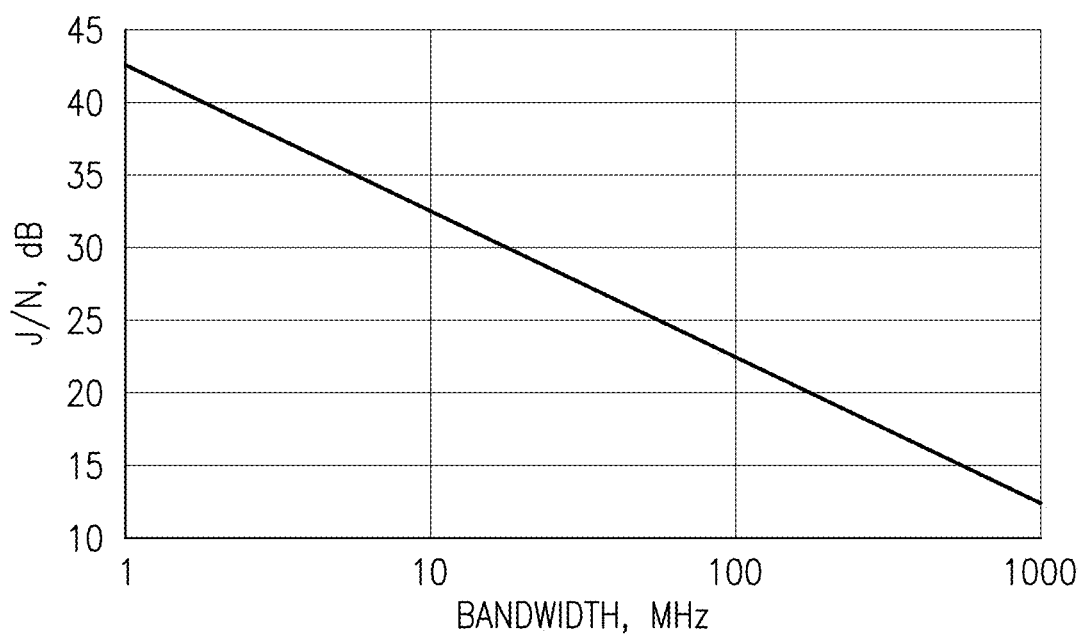
FIG. 2B is a plot of one example of an interference metric versus bandwidth.

FIG. 2B is a plot of one example of an interference metric versus bandwidth.

The plot depicts the interference metric J/N, corresponding to a ratio of interference power to noise power. One expression for a frequency independent form of J/N is provided below, where $P_t$ is transmit power, $\eta_t$ is transmitting antenna efficiency, A is an area of antenna transmitting interference, $G_r$ is wide angle sidelobe gain of the receiving antenna, L is loss, R is range separation, k is Boltzmann's constant, $T_s$ is the receiving system's noise temperature, and B is received bandwidth in MHz.

$$J/N=[P_t\eta_t AG_r L]/[4\pi R^2 kT_s B]$$

In an example implementation, $P_t$ can have a value of about 1 W, $\eta_t$ can have a value of approximately 55%, A can be equal to the area of a circular region having 1 foot diameter, $G_r$ can have a value of about −10 dBi, L can have a value of about 3 dB, R can have a value of about 1 mile, and $T_s$ can have a value of about 75° K antenna noise temperature.

The resulting J/N values cover a range of bandwidth values and indicate a ground terminal's sensitivity to interference. As seen from inspection of the equation above, sensitivity of a ground terminal to interference can arise when a source of interference is relatively close to the ground terminal such that the proximity of interference more than offsets the ground terminal's peak gain-to-sidelobe antenna gain values.

Accordingly, the sidelobes of a ground terminal's antenna provide a mechanism for interference to access the ground terminal. Such sidelobes can be relatively wide angle, and have sidelobe envelope values of, for instance, −10 dBi gain levels that serve to bound interference. Thus, received interference power levels within the operational received signal bandwidth(s) must be sufficiently high to degrade desired signal reception.

For example, a beamwidth of a main beam of the antenna can have peak gain levels of, for instance, 40 dBi to 60 dBi when aligned with the satellite. When receiving terrestrial interference, the interference can be received through the antenna's sidelobes due to the narrow beamwidth of the antenna's main beam that is aligned with the satellite.

Figure 3:
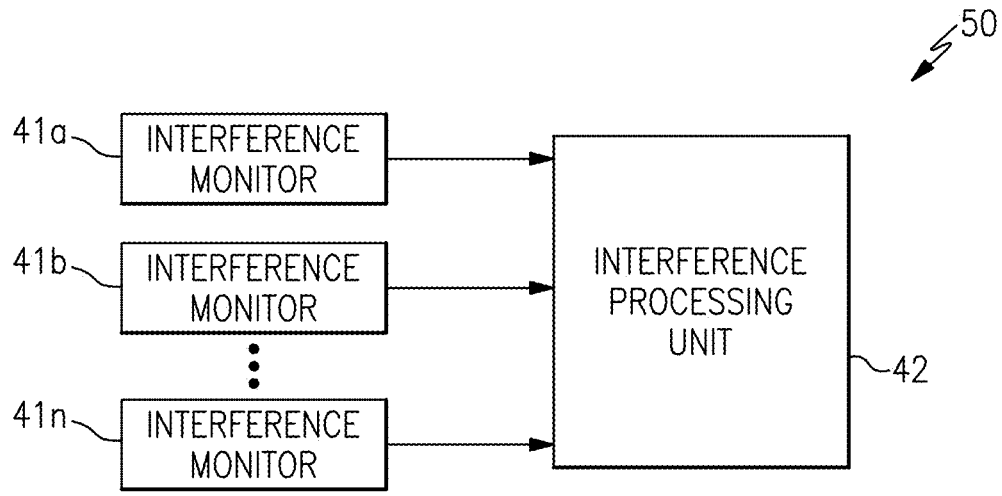
FIG. 3 is a schematic diagram of one embodiment of an interference monitoring system for a ground terminal.

FIG. 3 is a schematic diagram of one embodiment of an interference monitoring system 50 for a ground terminal. The interference monitoring system 50 includes interference monitors 41a, 41b, . . . 41n and an interference processing unit 42. As shown in FIG. 3, a common or shared interference processing unit can be used to process interference detection signals from multiple interference monitors.

Figure 4:
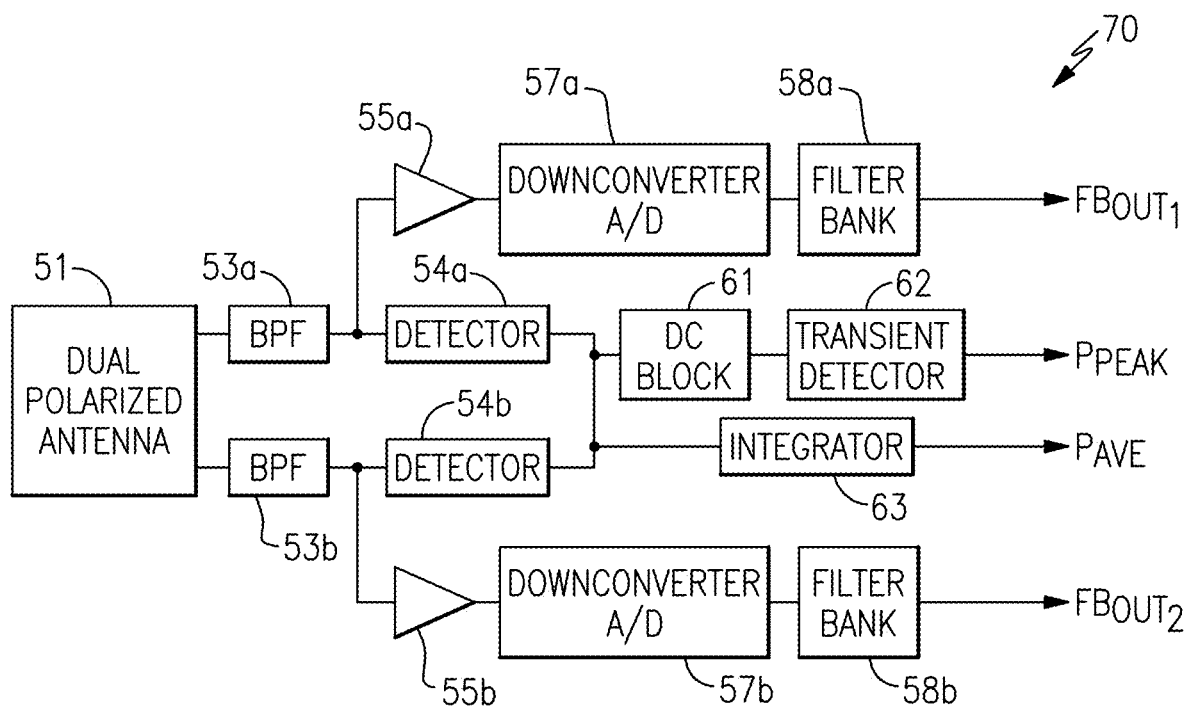
FIG. 4 is a schematic diagram of an interference monitor according to one embodiment.

FIG. 4 is a schematic diagram of an interference monitor 70 according to one embodiment. The interference monitor 70 includes a dual polarized antenna 51, a first bandpass filter (BPF) 53a, a second BPF 53b, a first detector 54a, a second detector 54b, a first amplifier 55a, a second amplifier 55b, a first downconverter and analog-to-digital conversion (A/D) circuit 57a, a second downconverter and A/D circuit 57b, a first filter bank 58a, a second filter bank 58b, a DC blocking circuit 61, a transient detector 62, and an integrator 63.

Although the interference monitor 70 of FIG. 3 illustrates one embodiment of an interference monitor, the teachings herein are applicable to interference monitors implemented in a wide variety of ways. Accordingly, other implementations are possible.

With reference to FIG. 4, the dual polarized antenna 51 generates a pair of orthogonally polarized signals in response to receiving a radio wave. Additionally, the dual polarized antenna 51 provides a first orthogonally polarized signal to the first BPF 53a and a second orthogonally polarized signal to the second BPF 53b.

The pair of orthogonally polarized signals correspond to a pair of signals that are substantially orthogonal, for instance, horizontally and vertically polarized signals, circularly polarized signals, or elliptically polarized signals. Although depicted as a single antenna, the dual polarized antenna 51 can be implemented using multiple antenna elements arranged to generate a pair of orthogonally polarized signals. As shown in FIG. 4, the first BPF 53a filters the first orthogonally polarized signal and the second BPF 53b filters the second orthogonally polarized signal. In certain implementations, the first BPF 53a and the second BPF 53b limit the bandwidth of the pair of orthogonally polarized signals to a signal bandwidth of a corresponding ground terminal. In certain implementations, the first BPF 53a and/or the second BPF 53b are tunable to aid in achieving a desired signal bandwidth after filtering. Although illustrated as bandpass filters, other filtering structures can be used to achieve a desired signal bandwidth for interference monitoring.

With continuing reference to FIG. 4, the first detector 54a detects interference present in the first filtered orthogonally polarized signal and the second detector 54b detects interference present in the second filtered orthogonally polarized signal. The first detector 54a and the second detector 54b can be implemented using any suitable RF detectors, including, but not limited to, logarithmic detectors or root mean square (RMS) detectors. Additionally, the output signal of the first detector 54a is combined with the output signal of the second detector 54b to generate a combined detection signal indicating a total detected interference of the received radio wave. In certain implementations, the output signal of the first detector 54a corresponds to a first low frequency signal indicating instantaneous signal level or power of the first filtered orthogonally polarized signal, while the output signal of the second detector 54b corresponds to a second low frequency signal indicating instantaneous signal level or power of the second filtered orthogonally polarized signal.

Thus, the pair of orthogonally polarized signals from the dual polarized antenna 51 are filtered by the first BPF 53a and the second BPF 53b to limit the spectrum to the bandwidth of the ground terminal's receiver. Additionally, the detector output signals are summed to respond to the total incident interference power irrespective of its polarization.

With continuing reference to FIG. 4, the summed output of the detectors is further processed to identify interference initiation and/or to indicate the level or amount of interference within threshold values. For example, the interference monitor 70 of FIG. 4 includes the integrator 63 for integrating the combined detection signal to detect the an average power ($P_{AVE}$) of the interference. Additionally, the combined detection signal is provided to the series combination of the DC blocking circuit 61 and the transient detector 62 to detect the peak power ($P_{PEAK}$) of the interference. Although an example in which average and peak power is detected by the interference monitor 70, an interference monitor can be implemented to detect any suitable interference power characteristic(s), such as other statistical measures of interference power.

The average power ($P_{AVE}$) and peak power ($P_{PEAK}$) of the interference are provided to an interference processing unit (for example the interference processing unit 42 of FIG. 3) to identify interference initiation and/or its threshold level. In certain implementations, the interference processing unit performs comparisons of the average power to an average power threshold and/or comparisons of the peak power to a peak power threshold. Additionally, the results of the comparisons are used to identify the presence and/or persistence of the interference.

Such an interference processing unit can respond to detected interference in a number of ways. In certain implementations, in response to detecting interference, the interference processing unit commands the ground terminal's auto-tracking system to maintain the known antenna positioning so interference does not produce beam pointing errors. Additionally or alternatively, the interference processing unit can initiate recording of interference when interference is detected. In contrast, ground stations that continuously record time periods without interference waste memory storage.

With continuing reference to FIG. 4, the first amplifier 55a serves as a pre-amplifier that scales the first filtered orthogonally polarized signal to a suitable amplitude for the input range of the first downconverter and A/D circuit 57a. Additionally, the first downconverter and A/D circuit 57a downconverts the first amplified signal to baseband or intermediate frequency (IF), and subsequently digitizes the first downconverted signal to generate a digital representation of the first filtered orthogonally polarized signal. Likewise, the second amplifier 55b scales the second filtered orthogonally polarized signal, and the second downconverter and A/D circuit 57b downconverts and digitizes the second amplified signal to generate a digital representation of the second filtered orthogonally polarized signal. In one example, each downconverter and A/D circuit includes a mixer for providing frequency downconversion from RF to IF or baseband, a low pass filter for filtering the downconverted signal, and an analog-to-digital converter for digitizing the filtered signal.

The digital representations of the first filtered orthogonally polarized signal and the second filtered orthogonally polarized signal are provided to the first filter bank 58a and the second filter bank 58b, respectively. The filter banks serve to provide analysis of spectral and time variation without spectrum analyzer expense.

For example, because potential interference sources and directional attributes of potential interference signals can vary over time, monitoring for interference on a continuous basis is beneficial in addition to identifying interference initiation. Accordingly, the first filter bank 58a and the second filter bank 58b serve to detect interference spectral and temporal variations to achieve a more precise interference power measurement and characterization.

In certain implementations, each filter bank operates to divide the receive bandwidth into frequency bins using a polyphase filter bank to determine the interference spectral distribution (for instance, narrowband, wideband, and/or time varying). The first filter bank 58a and the second filter bank 58b can provide a continuous output so that changes in interference are dynamically indicated.

The digital data ($FB_{OUT1}$) generated by the first filter bank 58a and the digital data ($FB_{OUT2}$) generated by the second filter bank 58b can be processed by an interference processing unit to generate information providing insight into unintentional interference and/or the strategy used by intentional interference. Moreover, continuous recording of interference events once detected allows further examination and information to identify its source. Advantageously, the first filter bank 58a and the second filter bank 58b operate on filtered representations of the orthogonal polarizations of detected interference, and thus concentrate on the receive bandwidth used by the ground terminal so that the expense of a spectrum analyzer is avoided.

Thus, when a ground terminal is implemented with an interference monitoring system in accordance with the teachings herein, the interference monitoring system serves to monitor undesired interference to identify the initiation of interference, to determine interference spectral characteristics, to follow changes in nature of the interference, and/or to determine interference direction attributes relative to the ground terminal. Such interference monitoring systems have low cost, relatively small component count, and serve to continuously monitor desired received signals to detect unwanted interference.

In contrast, certain commercial systems available for site surveys sample RF signals received within the site over very broad bandwidths, and process the sampled RF signals to provide both frequency and time domain analysis of interfering signals. However, such approaches consume significant computing resources and increase the cost of implementation of the ground station. Additionally, such approaches are focused primarily on scanning broad bandwidths to determine interference incident on the ground station generally rather than at a specific ground terminal located within the ground station. Thus, such approaches are ill-suited for determining directional attributes of potential sources of interference.

Figure 5:
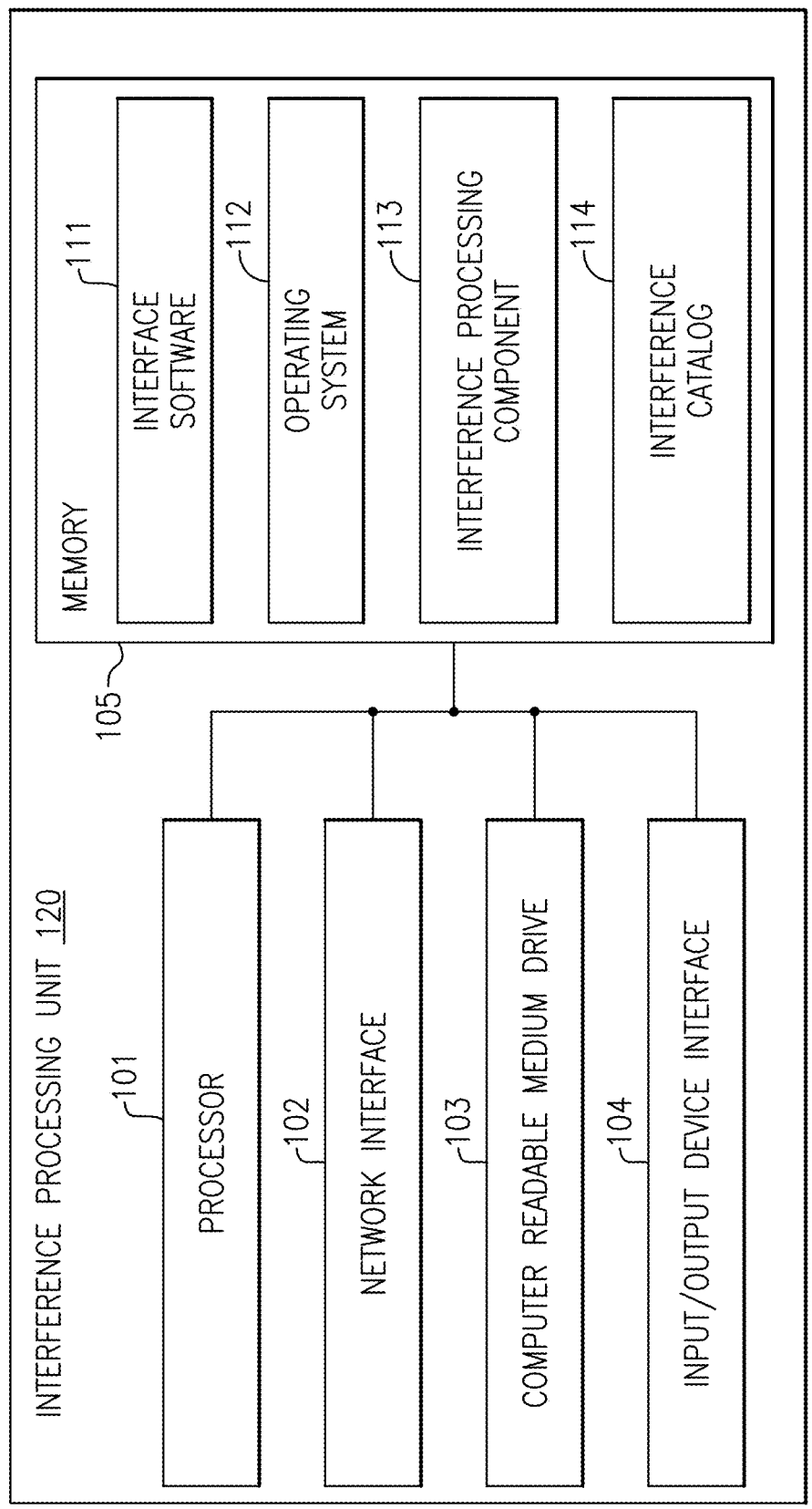
FIG. 5 is a schematic diagram of an interference processing unit according to one embodiment.

FIG. 5 is a schematic diagram of an interference processing unit 120 according to one embodiment. The interference processing unit 120 includes a processor 101, a network interface 102, a computer readable medium drive 103, an input/output device interface 104, and a memory 105. The interference processing unit 120 illustrates one embodiment of a computing device for processing data from one or more interference monitors. Although one embodiment of an interference processing unit is depicted, an interference processing unit can be implemented in a wide variety of ways.

The general architecture of the interference processing unit 120 of FIG. 5 includes an arrangement of computer hardware and software components that may be used to implement aspects of the present disclosure. The components of the interference processing unit 120 may be physical hardware components or implemented in a virtualized environment.

The network interface 102 provides connectivity to one or more networks, such as the network 8 of FIG. 1. Thus, the processor 101 can receive data and instructions from other computing systems or services via a network. The processor 101 also communicates with the memory 105, the computer readable medium drive 103, and the input/output device interference 104.

In the illustrated embodiment, the memory 105 includes interface software 111 for controlling the network interface 102, and an operating system 112 for providing computer program instructions used by the processor 101 in the general administration and operation of the interference processing unit 120, an interference processing component 113, and an interference catalog 114. The memory 105 can include, for example, RAM, ROM, and/or memory storage elements.

As shown in FIG. 5, the memory 105 further includes an interference processing component 113 for processing data from one or more interference monitors. For example, the interference processing component 113 can process digital representations of peak interference power ($P_{PEAK}$) and/or average interference power ($P_{AVE}$). Additionally or alternatively, the interference processing component 113 can process filter bank data (for instance, $FB_{OUT1}$ and/or $FB_{OUT2}$) generated from processing a filtered pair of orthogonally polarized signals.

In the illustrated embodiment, the memory 105 further includes an interference catalog 114 for cataloging detected interference. In one example, the interference catalog 114 indexes interference by one or more of: time of occurrence, duration, pulsed characteristics, average characteristics, frequency, bandwidth, and/or polarization.

In certain implementations, the interference processing unit 120 compares the interference power within the operational received signal bandwidths relative to a threshold level. When the level of interference is greater than the threshold level, the interference processing unit 120 sends a command to a corresponding tracking control system (for example, tracking control systems 4a, 4b, . . . 4n of FIG. 1) to cease closed loop tracking so interference does not produce beam pointing errors. Additionally or alternatively, the interference processing unit 120 initiates recording of the output of an interference monitor's filter banks (for example, the first filter bank 58a and the second filter bank 58b of FIG. 4) when the detected interference power is greater than the threshold.

Figure 6:
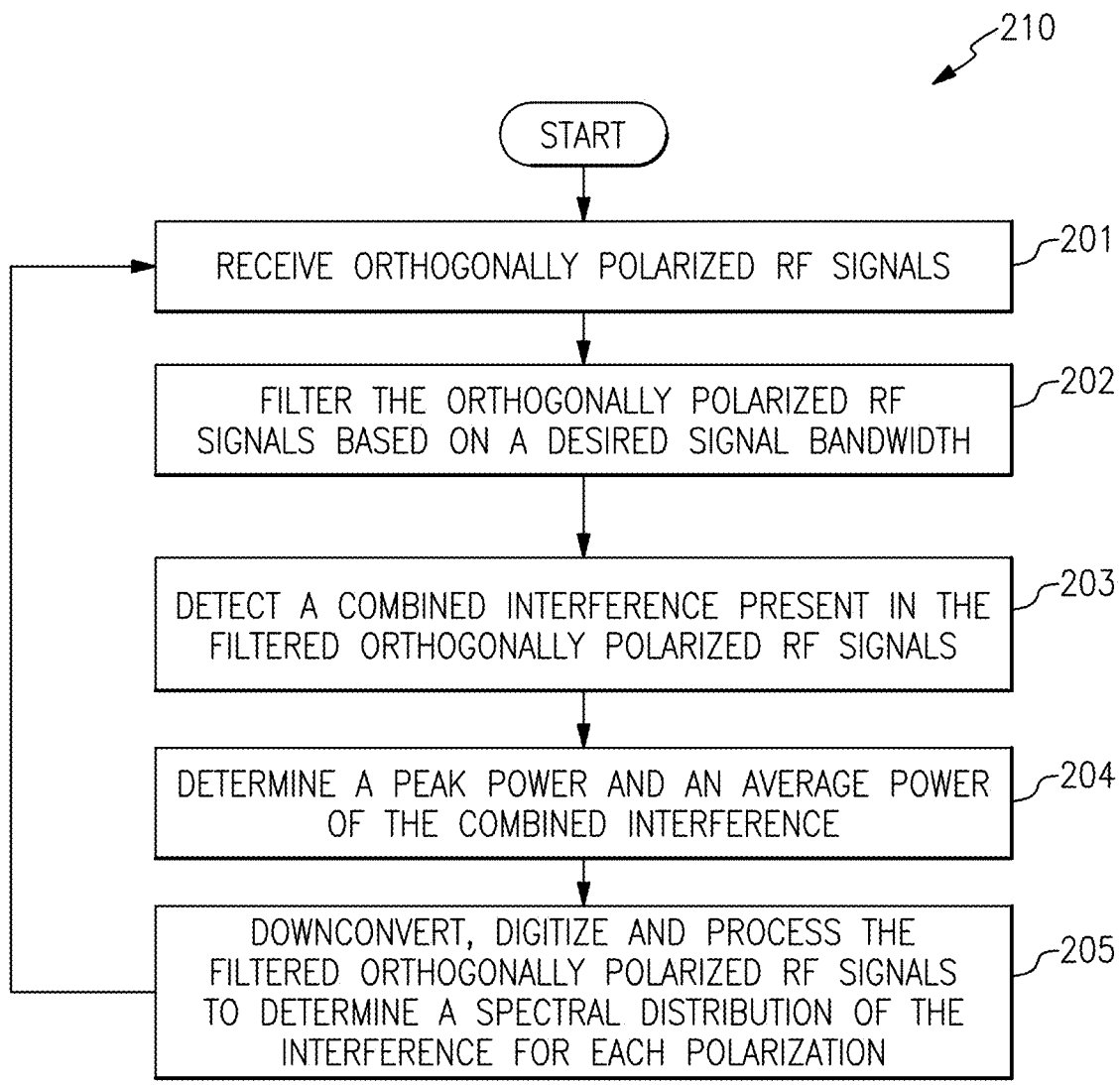
FIG. 6 is a flow chart depicting one embodiment of a method of interference monitoring.

FIG. 6 is a flow chart depicting one embodiment of a method 210 of interference monitoring. The method 210 can be performed by an interference monitor implemented in accordance with the teachings herein.

The method 210 begins at a step 201, in which orthogonally polarized RF signals are received by an interference monitor. For example, the interference monitor can include a dual polarized antenna (for instance, the dual polarized antenna 51 of FIG. 4) that generates a pair of orthogonally polarized RF signals in response to an incident radio wave that includes interference.

With continuing reference to FIG. 6, the method 210 continues to a step 202, in which the orthogonally polarized RF signals are filtered based on a desired signal bandwidth. The filtering can be performed using a pair of band pass filters (for instance, the BPF 53a and the BPF 53b of FIG. 4). In certain implementations, the bandwidth of filtering corresponds to that of the receive bandwidth of a corresponding ground terminal (for instance, ground terminals 1a, 1b, ... 1n of FIG. 1) to which the interference monitor is associated.

The method 210 continues to a step 203, in which a combined interference present in the filtered orthogonally polarized RF signals is detected. The combined interference be generated by combining the outputs of a pair of detectors (for instance, the detector 54a and the detector 54b of FIG. 4) that serve to detect the instantaneous power of the pair of filtered orthogonally polarized RF signals.

As shown in FIG. 6, the method 210 continues to a step 204, in which the a peak power and an average power of the combined interference is detected. In certain implementations, the average power is detected based on integrating the combined interference using an integrator (for instance, the integrator 63 of FIG. 4), and the peak power is detected based on processing the combined interference using a cascade of a DC blocking circuit (for instance, the DC blocking circuit 61 of FIG. 4) and a transient detector (for instance, the transient detector 62 of FIG. 4).

The method 210 continues to a step 205 in which the filtered orthogonally polarized RF signals are downconverted, digitized, and processed to determine a spectral distribution of the interference for each polarization. In certain implementations, the spectral distribution is determined using filter banks (for instance, the first filter bank 58a and the second filter bank 58b of FIG. 4) that process digital representations of each signal polarization.

As shown in FIG. 6, the method 210 returns to step 201. Although depicted as discrete steps, persons of ordinary skill in the art will appreciate that the steps of the method 210 can occur simultaneously. For example, the reception of the received orthogonally polarized RF signals in step 201 can occur continuously during operation of the interference monitor.

Figure 7:
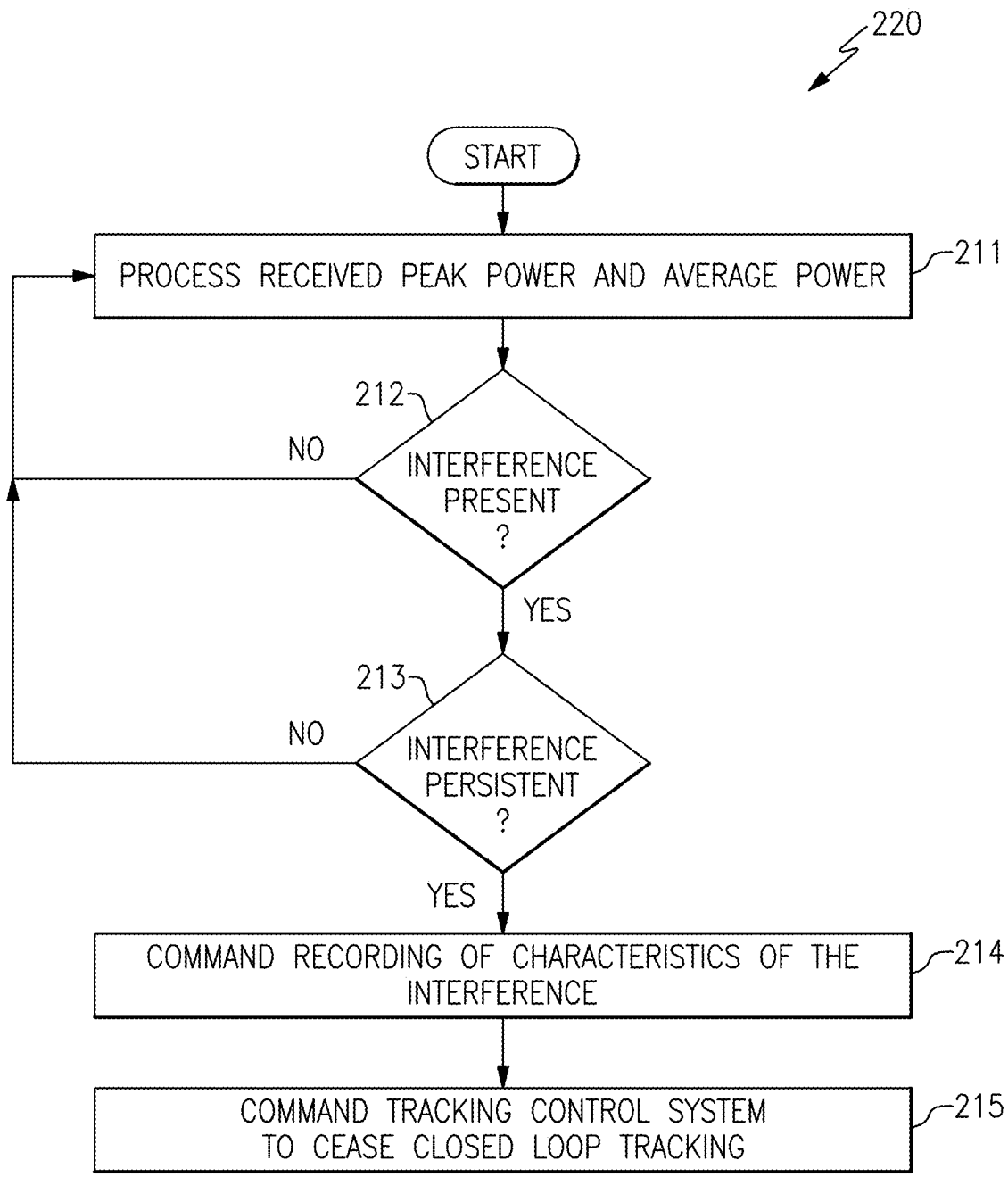
FIG. 7 is a flow chart depicting one embodiment of a method of processing interference signals from an interference monitor.

FIG. 7 is a flow chart depicting one embodiment of a method 220 of processing interference signals from an interference monitor. The method 220 can be performed by an interference processing unit implemented in accordance with the teachings herein.

The method 220 begins at step 211, in which received peak power and interference power is processed by the interference processing unit. In an ensuing decision step 212, the method 220 determines whether processing of the peak power and/or average power indicates that interference is present. Such processing can include comparison of the peak power and/or average power to one or more thresholds.

If no interference is present or detected, the method 220 returns to step 211. However, when interference is detected, the method 220 continues to a decision block 213 to determine if the level of interference is persistent.

In certain implementations, interference is of a sufficiently short enough duration and/or of a nature that the interference has little to no impact on the operation of a ground terminal in receiving desired signals from a satellite. For instance, communication waveforms include error correction and interleaving that are effective in mitigating narrow bandwidth interference and/or spread spectrum modulation can be used to mitigate interference. In another example, interference can be received in a pattern null with less gain than the sidelobe envelope.

If the interference is determined to not be persistent in block 213, the method 220 returns to step 211. However, when the interference is persistent, the method 220 continues to a step 214 in which the interference processing unit commands recording of characteristics of the interference and to a step 215 in which the interference processing unit commands a tracking control system to cease closed loop tracking. Although step 215 is depicted as occurring after step 214, the order of the steps can be reversed or performed simultaneously.

Detecting the Direction of Interference Using Multiple Interference Monitors

In certain implementations herein, the azimuth location of interference relative to a ground terminal is determined by processing the outputs of two or more interference monitors using amplitude monopulse techniques.

The presence of other ground terminals and/or other ground station features results in reflected interference components being received from different directions, referred to as multipath components. Resolving these multipath component directions is difficult.

In certain implementations herein, a pair of interference monitors are used to detect a simple azimuth direction of interference relative to a specific ground terminal. For example, when a first antenna and a second antenna of a pair of interference monitors have separated boresight axes, the two power levels in the same frequency bin levels containing interference provide the amplitude monopulse data to indicate an interference direction. In certain implementations, the beamwidth of the pair of antennas are separated by about 90° such that each antenna's boresight is about 45° from the axis separating the antennas.

In one example, a first interference monitor is positioned to the left of a second interference monitor, such the first interference monitor includes a left antenna and the second interference monitor includes a right antenna. If the right antenna has a lower signal level than the left antenna, the signal direction arrives from the left. The signal power difference values determine how far the signal direction is from the axis separating the two antennas. If the signal levels are identical, then the signal arrival direction is aligned with the axis. In logarithmic values, the differences are dB values corresponding to the antenna pattern values in the direction of the interference.

In certain implementations, the interference monitor's antenna is implemented with one or more design techniques for reducing its backlobe values to thereby reduce reflected components from the antenna so that the interference incident on the antenna is measured and reflected interference is reduced. Interference monitor antennas have broad pattern coverage relative to a receiving antenna of a ground terminal.

Accordingly, an interference monitor antenna design can serve to provide both good detection and azimuth angular location performance over a spatial quadrant. In certain implementations, the antennas of four interference monitors are positioned to provide coverage over a full 360° azimuth range. For example, four antennas and corresponding electronics can serve to provide a clear field of view over the full 360° azimuth range even in the presence of blockage of the ground terminal's receiving antenna.

Thus, a ground terminal can include an arrangement of interference monitors for detecting a directional attribute of interference. The analysis of the signals and the characterization of the directional component from individual interference monitors can be logged and transmitted to an interference processing unit. The interference processing unit, which can be local to a ground terminal, can process the signal information to make adjustments to the operation of the ground terminal, such as adjusting auto-tracking or otherwise modifying aspects of the operation of the ground terminal.

Figure 8:
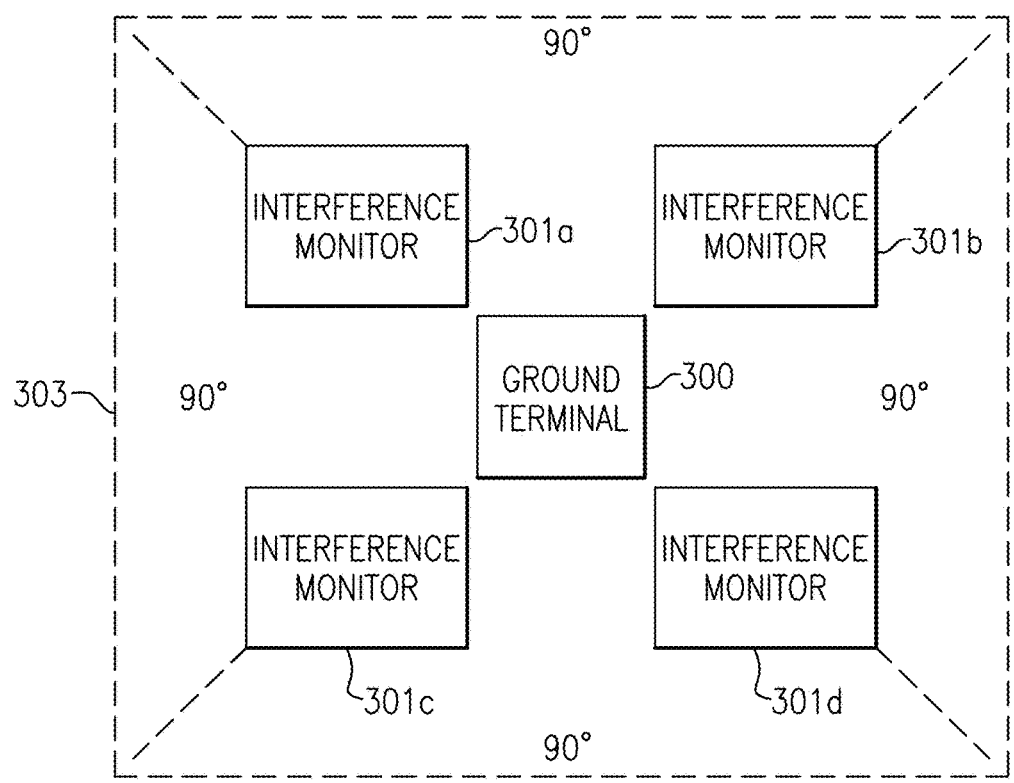
FIG. 8 is a schematic diagram of ground terminal including four interference monitors for monitoring interference present in different spatial quadrants.

FIG. 8 is a schematic diagram of ground terminal 300 including four interference monitors 301a, 301b, 301c, and 301d for monitoring interference present in different spatial quadrants.

The interference monitors 301a-301d are positioned to receive signals from the four different spatial quadrants, each representative of an approximate 90-degree azimuth angular range. Interference signals beyond a boundary 303 of the ground terminal 300 are reflected and scattered from both the terrain and manmade features resulting in a complex multipath distribution of interference components. As a result, an indication of the possible interference azimuth direction can be done with an illustrative two antenna amplitude monopulse configuration at each of the four quadrants centered at the ground terminal 300 to provide an indication of the interference direction.

The interference direction indicated by the amplitude monopulse output is helpful in determining the location of the interference source. In some cases, the interference access is blocked by ground station features such that the ground terminal 300 does not receive interference from certain directions. When interference access is blocked by ground station features, coverage by interference monitors over the blocked angular area may be unnecessary, which can thus simplify the interference monitor implementation.

Figure 9A:
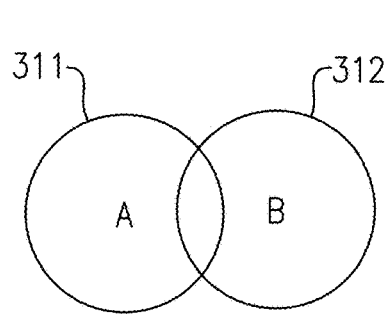
FIG. 9A is a schematic diagram of one example of overlapping fields of view of two interference monitors.

FIG. 9A is a schematic diagram of one example of overlapping fields of view of two interference monitors. The fields of view include a first field of view 311 associated with a first interference monitor and a second field of view 312 of a second interference monitor.

Figure 9B:
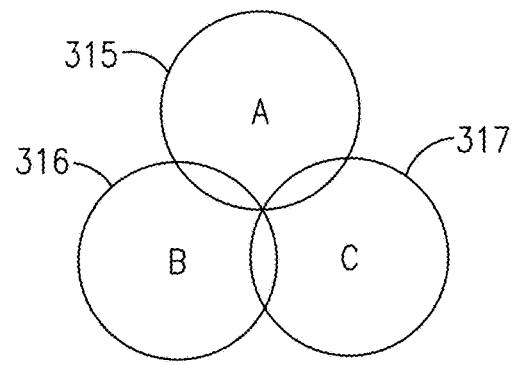
FIG. 9B is a schematic diagram of one example of overlapping fields of view of three interference monitors.

FIG. 9B is a schematic diagram of one example of overlapping fields of view of three interference monitors. The fields of view include a first field of view 351 associated with a first interference monitor, a second field of view 316 of a second interference monitor, and a third field of view 317 of a third interference monitor.

In certain applications, interference access may have a clear field of view without multipath components allowing more accurate directional attributes than can be achieved for ground terminal antennas that have significant multipath sources. In such scenarios, three interference monitors may be incorporated with antenna beam centers on an equilateral triangular manner as depicted in FIG. 9B.

For interference monitors arranged with antenna beam centers in an equilateral triangle arrangement, the interference direction can be more accurately determined in accordance with two angular coordinates, such as azimuth and elevation. Additionally, the monitor antenna coverage is dictated by the angular extent of the interference access.

Figure 10:
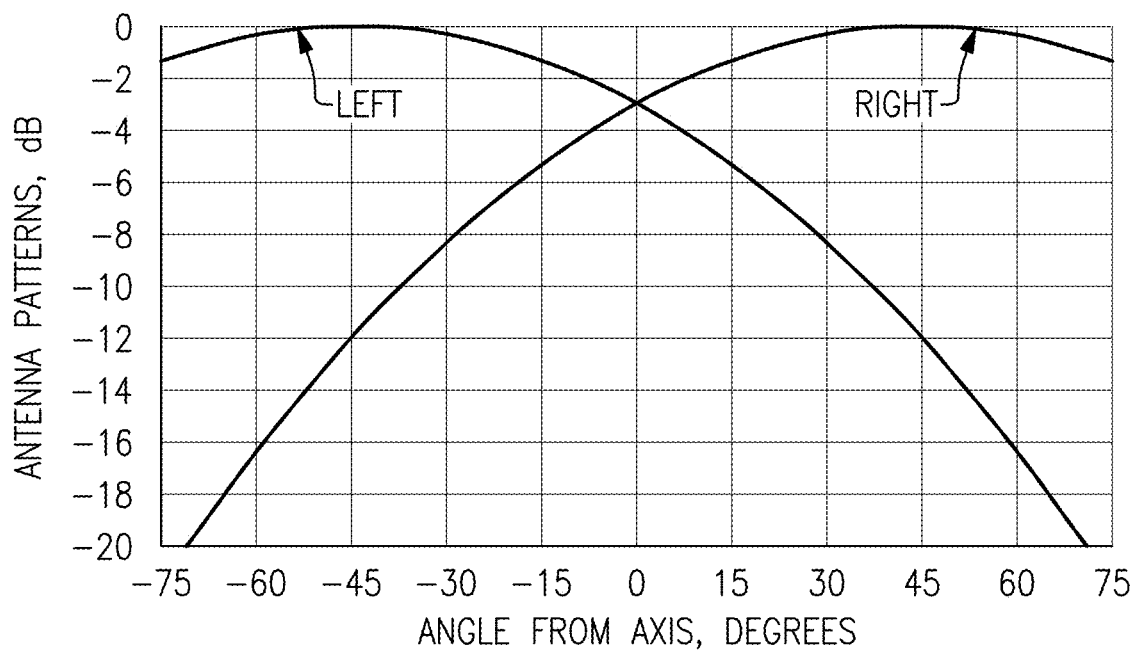
FIG. 10 is a plot of radiation pattern of two antennas versus angle from axis.

FIG. 10 is a plot of radiation pattern of two antennas versus angle from axis.

The azimuth location of the interference relative to the ground terminal can be determined by processing the outputs of a pair of interference monitors whose antenna boresight axes are angularly separated. For example, an interference monitoring system operable to determine azimuth location of the interference relative to a ground terminal can include two interference monitors each with a receiving antenna having a beamwidth equal to about 90 degrees and with the boresight of each antenna oriented at an angle of about 45 degrees from the axis separating the two antennas. For example, the interference monitors can be arranged with a beam pattern coverage as described above with respect to FIG. 9A.

In FIG. 10, the radiation pattern of two antennas of a pair of interference monitors is depicted. The antennas are identified in FIG. 10 as a left antenna and a right antenna. In operation, the level of interference in the same frequency bins are compared and the differences in their values are determined.

The interference power in the respective frequency bins depends on the antenna pattern gain of each antenna, i.e. left antenna and right antenna as in FIG. 10. As an example, if the right antenna has a lower interference power than the left antenna, the interference can be determined to arrive from the left. The signal difference values can assist in determining how far the signal direction is from the axis separating the two antenna elements. If the signal levels are identical, then the signal arrival direction is aligned with the axis.

Figure 11A:
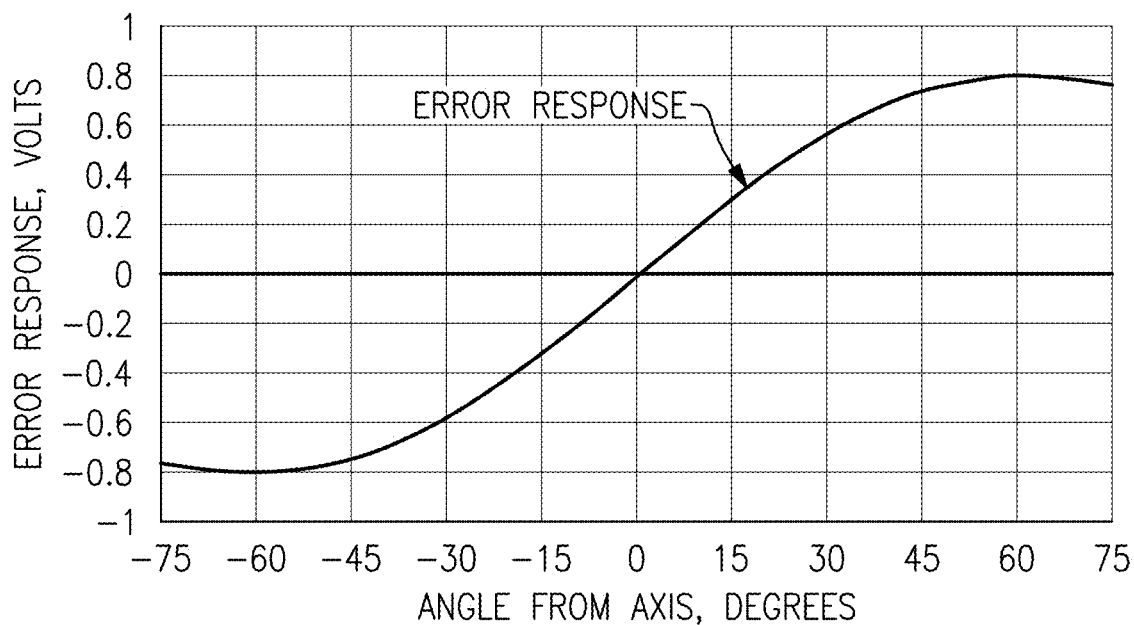
FIG. 11A is a plot of one example of error response in voltage versus angle from axis.
Figure 11B:
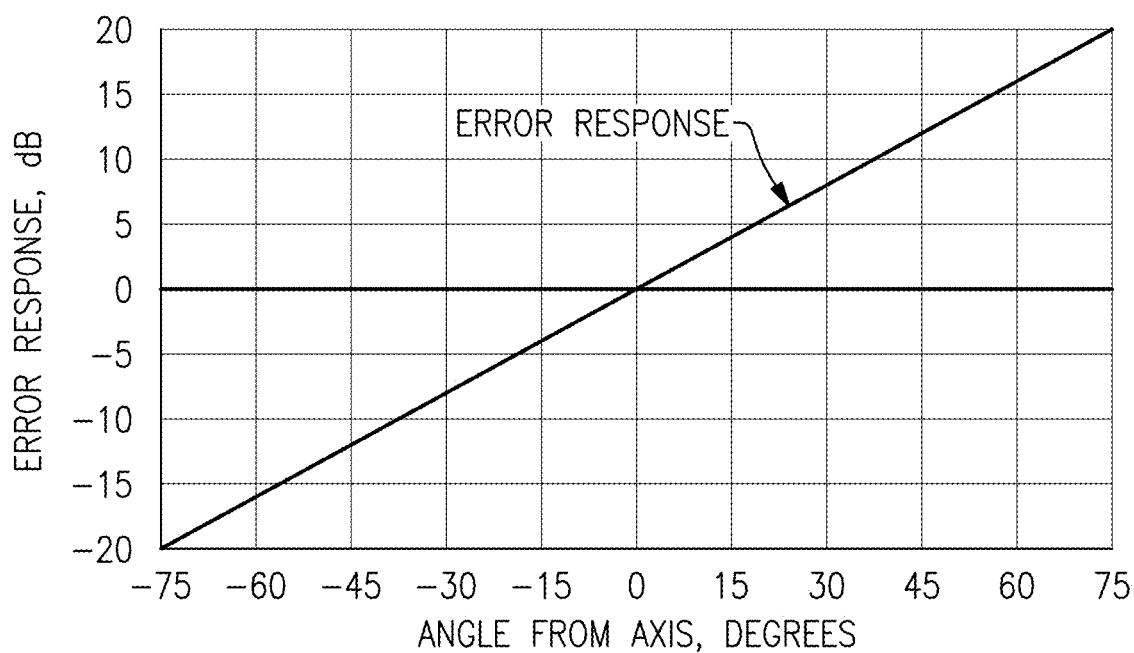
FIG. 11B is a plot of one example of error response in decibels versus angle from axis.

FIGS. 11A and 11B are two plots of error response versus angle from axis. The error response corresponds to the difference of the interference power in the same frequency bins of a pair of interference monitors.

In FIG. 11A, the error response units are voltage.

In FIG. 11B, the frequency bin signals are converted to dB levels. As shown by a comparison of FIG. 11A and FIG. 11B, converting the frequency bin signals to dB levels following the antenna pattern angular variation results in the error response becoming more linear.

Figure 12:
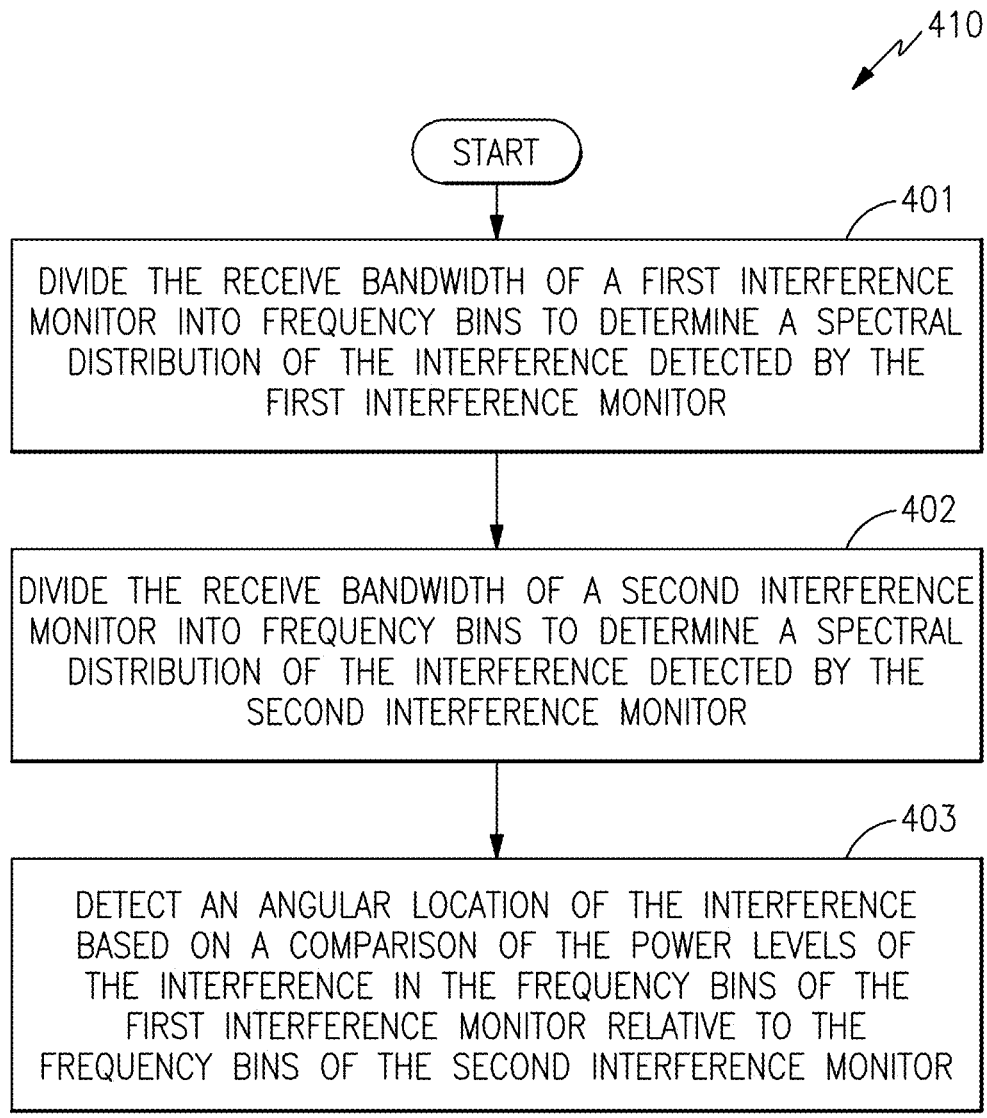
FIG. 12 is a flow chart depicting one embodiment of a method of detecting an angular location of interference using interference monitors.

FIG. 12 is a flow chart depicting one embodiment of a method 410 of detecting an angular location of interference using interference monitors. The method 410 can be performed by an interference monitoring system implemented in accordance with the teachings herein.

The method 410 begins at a step 401, in which the receive bandwidth of a first interference monitor is divided into frequency bins to determine a spectral distribution of the interference detected by the first interference monitor. For example, the first interference monitor can include filter banks (for instance, the first filter bank 58a and the second filter bank 58b of FIG. 4) for determining the spectral distribution of the detected interference.

With continuing reference to FIG. 12, the method 410 continues to a step 402, in which the receive bandwidth of a second interference monitor is divided into frequency bins to determine a spectral distribution of the interference detected by the second interference monitor. In certain implementations, the first interference monitor and the second interference monitor are arranged with overlapping fields of view as described above with respect to FIG. 9A.

The method 410 continues to a step 403, in which an angular location of the interference is detected based on a comparison of the power levels of interference in the frequency bins of the first interference monitor to the frequency bins of the second interference monitor. For example, for a pair of interference monitor antennas with separated boresight axes, the two power levels in the same frequency bin levels containing interference provide the amplitude monopulse data to indicate an interference direction.

CONCLUSION

Various embodiments described herein are directed towards systems and methods of monitoring interference to identify emerging or established interference signals of a radio communication system. For example, the systems and methods herein can be used to analyze interference within a desired signal bandwidth and to determine the spectral and temporal characteristics of the interference. Still further, an interference monitoring system can be configured with multiple interference monitors to detect the angular direction of the interference.

Various embodiments of interference monitoring systems and methods discussed herein can be used to monitor interference within the bandwidth of RF signals received by ground terminal(s) of a ground station in communication with one or more satellites. In such applications, the embodiments of interference monitoring systems and methods discussed herein can be configured to send commands to the auto-tracking unit of the ground terminal to transition from closed loop tracking to open loop tracking upon detecting interference so as to prevent beam pointing errors arising from interference. The embodiments of the interference monitoring systems and methods discussed herein can also be configured to record characteristics of the interference upon identification of the beginning of the interference. Further embodiments of the interference monitoring systems and methods may also be applied to other types of applications or monitoring systems not including ground terminals.

An aspect of at least one of the inventions disclosed herein includes the realization that interference monitoring systems that sample signals over broad bandwidths and conduct detailed frequency and time domain analysis of potential infringing signals can be unnecessarily complex and expensive. Thus, interference monitoring systems that do not include large-bandwidth frequency spectrum analyzers can result in a less expensive and complex interference monitoring system. Such specific frequency bandwidths may be selected and/or tuned to correspond to one or more frequency bandwidths used by specific ground terminals of a ground station. In some embodiments, interference monitoring systems can facilitate the continuous operation of interference monitors at specific frequency bandwidths without large-bandwidth frequency spectrum analyzers, thereby resulting in a less expensive and complex system, yet enable beneficial interference monitoring and compensation.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In the drawings like numbers are used to represent the same or similar elements wherever possible. The depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

The features recited in claims appended to this disclosure are intended to be assessed in light of the disclosure as a whole.

At least some elements of a device of the invention can be controlled—and at least some steps of a method of the invention can be effectuated, in operation—with a programmable processor governed by instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A radio communication system with interference monitoring, the radio communication system comprising:
    at least one interference monitor configured to monitor for interference within one or more radio frequency (RF) signal bandwidths of a wireless communication link, wherein the at least one interference monitor comprises:
        a dual polarized antenna configured to output a pair of orthogonally polarized signals in response to a radio wave,
        a pair of filters configured to filter the pair of orthogonally polarized signals to generate a pair of filtered orthogonally polarized signals, and
        a pair of detectors configured to process the pair of filtered orthogonally polarized signals to generate a pair of detection signals,
        wherein the at least one interference monitor is further configured to combine an output signal from each of the detectors to generate a combined interference signal, and to process the combined interference signal to determine at least one interference power characteristic; and
    an interference processing unit configured to detect for presence of interference based on the at least one interference power characteristic, and to command recording of one or more characteristics of the interference in response to detecting the presence of interference.

2. The radio communication system of claim 1, further comprising a ground terminal configured to communicate with a satellite over the wireless communication link.

3. The radio communication system of claim 2, further comprising a tracking control system configured to control alignment of a receiving antenna of the ground terminal relative to the satellite, wherein the interference processing unit is further configured to command the tracking control system to transition from closed loop tracking to open loop tracking of the receiving antenna in response to detecting interference.

4. The radio communication system of claim 2, wherein the at least one interference monitor comprises two or more interference monitors arranged to collectively monitor for the interference over a full angular range providing interference access to the ground terminal.

5. The radio communication system of claim 4, wherein the two or more interference monitors comprises four interference monitors each arranged in a different one of four quadrants.

6. The radio communication system of claim 2, wherein the interference processing unit is further configured to detect for a cause of degradation in signal quality of the wireless communication link based on an evaluation of built in test equipment (BITE) of the ground terminal, an antenna pointing error of the ground terminal, and the one or more recorded characteristics of the interference.

7. The radio communication system of claim 1, wherein the at least one interference power characteristic comprises an average interference power and a peak interference power.

8. The radio communication system of claim 7, wherein the at least one interference monitor comprises an integrator configured to process the combined interference signal to generate the average interference power, and a cascade of a DC blocking circuit and a transient detector configured to process the combined interference signal to generate the peak interference power.

9. The radio communication system of claim 1, wherein the at least one interference monitor further comprises a pair of downconverter and data conversion circuits configured to process the pair of filtered orthogonally polarized signals to generate a pair of digital signals, and a pair of filter banks configured to process the pair of digital signals to determine a spectral distribution of each of the filtered orthogonally polarized signals.

10. The radio communication system of claim 9, wherein the spectral distribution indicates interference power divided into a plurality of frequency bins covering the one or more RF signal bandwidths of the wireless communication link.

11. The radio communication system of claim 1, wherein the interference processing unit is configured to detect for the presence of interference based on comparing the at least one interference power characteristic to at least one threshold.

12. The radio communication system of claim 1, wherein the at least one interference monitor comprises a first interference monitor and a second interference monitor, the interference processing unit further configured to determine a direction of the interference based on a difference in an amount of interference measured by the first interference monitor and the second interference monitor.

13. The radio communication system of claim 12, wherein the interference monitor unit is configured to determine an angular location of the interference based on a comparison of interference power in a first plurality of frequency bins of the first interference monitor to interference power in a second plurality of frequency bins of the second interference monitor.

14. A method of interference monitoring in a radio communication system, the method comprising:
monitoring for interference within one or more radio frequency (RF) signal bandwidths of a wireless communication link using at least one interference monitor, wherein monitoring for interference comprises:
generating a pair of orthogonally polarized signals in response to a radio wave,
filtering the pair of orthogonally polarized signals to generate a pair of filtered orthogonally polarized signals using a pair of filters,
processing the pair of filtered orthogonally polarized signals to generate a pair of detection signals using a pair of detectors,
combining an output signal from each of the detectors to generate a combined interference signal, and
processing the combined interference signal to determine at least one interference power characteristic;
detecting for presence of interference based on the at least one interference power characteristic using an interference processing unit; and
recording one or more characteristics of the interference in response to detecting the presence of interference.

15. The method of claim 14, further comprising controlling alignment of a receiving antenna of a ground terminal relative to a satellite using a tracking control system, and commanding the tracking control system to transition from closed loop tracking to open loop tracking of the receiving antenna in response to detecting the presence of interference.

16. The method of claim 14, wherein the at least one interference power characteristic comprises an average interference power and a peak interference power.

17. The method of claim 14, further comprising processing the pair of filtered orthogonally polarized signals to generate a pair of digital signals using a pair of downconverter and data conversion circuits, and processing the pair of digital signals to determine a spectral distribution of each of the filtered orthogonally polarized signals using a pair of filter banks.

18. The method of claim 17, wherein the spectral distribution indicates interference power divided into a plurality of frequency bins covering the one or more RF signal bandwidths of the wireless communication link.

19. The method of claim 14, wherein the at least one interference monitor comprises a first interference monitor and a second interference monitor, the method further comprising determining a direction of the interference based on a difference in amount of interference measured by the first interference monitor and the second interference monitor.

20. The method of claim 19, further comprising determining an angular location of the interference based on a comparison of interference power in a first plurality of frequency bins of the first interference monitor to interference power in a second plurality of frequency bins of the second interference monitor.

21. An interference monitor comprising:
a dual polarized antenna configured to output a pair of orthogonally polarized signals in response to a radio wave;
a pair of filters configured to filter the pair of orthogonally polarized signals to generate a pair of filtered orthogonally polarized signals; and
a pair of detectors configured to process the pair of filtered orthogonally polarized signals to generate a pair of detection signals;
an integrator configured to process the combined interference signal to generate the average interference power; and
a cascade of a DC blocking circuit and a transient detector configured to process the combined interference signal to generate a peak interference power.

22. The interference monitor of claim 21, further comprising:
a pair of downconverter and data conversion circuits configured to process the pair of filtered orthogonally polarized signals to generate a pair of digital signals; and
a pair of filter banks configured to process the pair of digital signals to determine a spectral distribution of each of the filtered orthogonally polarized signals.

* * * * *